United States Patent [19]

Schmidt et al.

[11] Patent Number: 4,519,432

[45] Date of Patent: May 28, 1985

[54] REINFORCED POLYURETHANE TIRES

[75] Inventors: Andreas R. Schmidt, Reinach, Switzerland; Herbert F. Strohmayer, Allentown, Pa.; Walter Sibral, Tulln, Austria; Barton Milligan, Coplay, Pa.

[73] Assignee: Lim International S.A., Luxembourg

[21] Appl. No.: 577,960

[22] Filed: Feb. 8, 1984

[51] Int. Cl.$^3$ .............................. B60C 9/00; B60C 1/00
[52] U.S. Cl. ............................... 152/357 A; 152/359;
152/361 R; 156/117; 156/125; 156/245;
264/263; 264/279; 264/326; 528/63; 528/64;
528/65
[58] Field of Search ........... 152/357 R, 357 A, 356 R,
152/359 R, 330 R, 361 R, 151, 165, 246, 323;
528/63–65; 156/110.1, 112, 113, 117, 125, 242,
245, 910; 264/326, 501, 263, 279

[56] References Cited

U.S. PATENT DOCUMENTS

| | | | |
|---|---|---|---|
| 2,713,884 | 7/1955 | Schwartz | 152/330 R |
| 3,690,363 | 9/1972 | Guyot | 152/359 |
| 3,745,151 | 7/1973 | Takeda et al. | 528/323 |
| 3,826,298 | 7/1974 | Tanaka et al. | 152/359 |
| 3,849,976 | 11/1974 | Kenyon | 57/236 |
| 3,869,429 | 3/1975 | Blades | 528/341 |
| 3,869,430 | 3/1975 | Blades | 528/348 |
| 3,929,180 | 12/1975 | Kawase et al. | 152/359 |
| 3,950,590 | 4/1976 | Edelman et al. | 428/395 |
| 3,977,172 | 8/1976 | Kerawalla | 57/237 |
| 4,043,725 | 8/1977 | Schmidt | 425/542 |
| 4,044,540 | 8/1977 | Toki et al. | 57/242 |
| 4,044,811 | 8/1977 | Dudek et al. | 152/354 R |
| 4,090,547 | 5/1978 | Schmidt | 152/354 R |
| 4,124,345 | 11/1978 | Grunner et al. | 425/183 |
| 4,155,394 | 5/1979 | Shepherd et al. | 152/359 |
| 4,259,129 | 3/1981 | Schmidt | 156/125 |
| 4,277,295 | 7/1981 | Schmidt et al. | 156/117 |
| 4,278,779 | 7/1981 | Nakagawa et al. | 525/432 |

*Primary Examiner*—Edward Kimlin
*Assistant Examiner*—Thomas Bokan
*Attorney, Agent, or Firm*—Russell L. Brewer; E. Eugene Innis; James C. Simmons

[57] ABSTRACT

This invention relates to reinforced tire utilizing polyurea or polyurethane formulations having low hysteresis. The polymer having low hysteresis is formed by reacting a prepolymer of an aromatic isocyanate and a high molecular weight difunctional polyol with a chain extender mix comprising an aromatic diamine and difunctional polyol. In these compositions the aromatic diisocyanate and aromatic diamine are selected so that there is substantial symmetry between the molecules. The reinforcement used is preferably an aromatic polyamide.

16 Claims, No Drawings

REINFORCED POLYURETHANE TIRES

TECHNICAL FIELD

This invention relates to reinforced pneumatic polyurethane tires utilizing urethane compositions having low hysteresis. The urethane compositions are well suited for the high shock and vibration environments experienced by reinforced tires.

BACKGROUND OF THE PRIOR ART

Representative patents showing some urethane formulations, and molding techniques for pneumatic tire formulations, are as follows:

U.S. Pat. No. 2,713,884 shows the manufacture of a tire composition having a tread section of polyester-diisocyanate elastomer bonded with an adhesive formulation of polyalkylene ether glycol diisocyanate elastomer to a rubber tire stock. The polyester diisocyanate elastomer was formed by reacting adipic acid with ethylene and propylene glycol and with 4,4'-methylene diphenyl diisocyanate.

U.S. Pat. No. 4,044,811 shows the manufacture of a laminated tire which utilizes a polyurethane formed from a prepolymer of toluene diisocyanate and a polyalkylene glycol such as poly(tetramethylene ether glycol) and a diamine chain extender such as ethylene diamine, methylene-bis(2-chloroaniline) (MOCA) and the like.

U.S. Pat. No. 4,090,547 shows the manufacture of a urethane tire wherein the urethane is formed by reacting a prepolymer of poly(tetramethylene ether glycol) and toluene diisocyanate having an isocyanate content of about 4% with meta-phenylenediamine as a chain extender. Similar formulations utilize MOCA as the chain extender.

In the manufacture of tires it has been customary to incorporate reinforcing cords into the tire to impart strength. Representative fibers as reinforcing cords for pneumatic tire applications are shown in U.S. Pat. Nos. 3,869,430; 3,977,172; 3,950,590; 3,929,180; 4,278,779; 4,044,540; 3,849,976; 3,826,298; 3,745,151; 3,690,363 and 4,155,394. Basically the common fibers utilized for reinforcing tires are glass filament, nylon, rayon, aromatic polyamides, polyvinyl alcohol, steel, polyethylene 2,6-naphthalate, and polyester. Within each class or family of tire cords compositions mentioned there are numerous modifications which are designed to achieve the desired characteristics in terms of strength, adhesion and other properties desired in tires.

One of the problems associated with the manufacture of reinforced polyurethane tires has been that the polyurethane resins were not able to withstand the heat generated at the point of contact with the reinforcing cord. It is known that the rapid compression and relaxation of the tire at the point of contact between the polyurethane composition and the cord causes heat buildup due to frictional forces. This heat must be dissipated otherwise the polymer will degrade and the tire will fail. Another problem, assuming the heat buildup problem was solved, has been one of obtaining desired tire strength. Numerous cords such as rayon, nylon and polyester when utilized in the manufacture of polyurethane tires generally do not provide this strength even though such fibers are effective in rubber bias and radial tires. As a partial explanation, polyurethane tires are made by casting a liquid medium into a mold and cured. The tires are not formed from belts as in rubber tire manufacture. When rayon and polyester cord are used as a reinforcing material, a substantial cord has to be utilized to achieve desired tire strengths. However, because there is a large amount of cord, it is difficult to achieve uniform dispersion of the urethane composition throughout the mass of reinforcing cord. As a result, good adhesion and contact is not achieved on a consistent basis. Other fibers, such as steel, although having desired strength, have poor adhesion to polyurethane compositions. Nylon has a tendency to elongate during molding.

U.S. Pat. Nos. 4,124,345; 4,277,295; and 4,259,129 relate to molding equipment for urethane tire manufacture and to reinforcing techniques for such tires.

SUMMARY OF THE INVENTION

This invention relates to an improved reinforced, pneumatic polyurethane tire wherein the tire comprises a fibrous reinforcing cord and a polyurethane composition in contact with the cord. The improvement resides in utilizing a polyurethane composition having a low hysteresis formed by reacting (1) a prepolymer formed by reacting (a) an aromatic polyisocyanate represented by the formula:

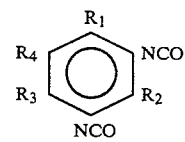

where $R_1$, $R_2$, $R_3$ and $R_4$ are hydrogen, alkyl having 1–4 carbon atoms, nitrile, halogen, $CO_2R_5$, $CONR_6R_7$ where $R_5$ is an alkyl group of 1–6 carbon atoms, and $R_6$ and $R_7$ are hydrogen or an alkyl of 1–6 carbon atoms and mixtures of same;

with (b) a difunctional polyol of a molecular weight from 500–5000, said prepolymer having an excess isocyanate content of from about 2–12 weight %, with (2) a chain extender mix comprising a long chain difunctional polyol of a molecular weight of from 500–5000 in combination with an aromatic diamine represented by the formula:

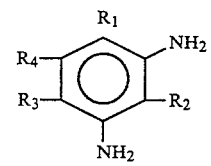

where $R_1$, $R_2$, $R_3$ and $R_4$ are hydrogen, alkyl having 1–4 carbon atoms, nitrile, halogen, $CO_2R_5$, $CONR_6R_7$ where $R_5$ is an alkyl group of 1–6 carbon atoms, and $R_6$ and $R_7$ are hydrogen or an alkyl of 1–6 carbon atoms; said polyol being present in an amount to provide 0.5–5 equivalent amine per equivalent polyol of said chain extender mix and then curing the resulting reaction product.

In a preferred embodiment the fibrous reinforcing cord is an aromatic polyamide.

Some of the significant advantages of the reinforced, pneumatic polyurethane tire composition contemplated by this invention are:

the tire can endure substantial high rates of speed and at considerable load for extended periods of time;

there is extended resistance to thermal failure of the tire composition;

the tire has good tear and cut resistance; there is outstanding strength and adhesion of the polyurethane to the cord when using the aromatic polyamide cord as reinforcement; and there is reduced rolling friction primarily due to reduced heat buildup in the tire caused by internal frictional forces.

DETAILED DESCRIPTION OF THE INVENTION

The procedure for manufacturing reinforced pneumatic polyurethane tires of this invention are well known and described in the art. In one type of process the reinforcing cord is distributed about a generally toroidal core and the core is encapsulated with resin through the use of a series of ring segments of larger radii than the core radius to form a coaxial annular space between the toroidal core and the ring segments. Encapsulations effected by filling the space between the core and the ring segment with a urethane forming composition and curing. Representative apparatus and processes for the manufacture of reinforced tires of the pneumatic type include U.S. Pat. No. 4,043,725; 4,124,345 and 4,259,129. These apparatus and molding techniques are incorporated by reference.

The reinforcing fibrous materials suited for forming the reinforced pneumatic tire include nylon, polyester, glass fiber, polyvinyl alcohol, polyester, metal wire, e.g. steel wire, aromatic polyamide and virtually any other fibrous cord utilized for forming reinforced, pneumatic tires. Of these fibrous materials, however, the aromatic polyamides are preferred. Representative examples include poly(chloro-p-phenylene terephthalamide), a copolymer of (chloro-p-phenylene/p-phenylene terephthalamide) poly(p-phenylene 2,6-naphthalene dicarboxamide, and a copolymer (4,4'-methylene diphenylene/p-phenylene-terephthalamide). Generally these fibers are classified as poly(p-phenylene terephthalamide fibers, and examples are shown in U.S. Pat. Nos. 3,869,429 and 3,869,430 which are incorporated by reference. There are variations of the poly(p-phenylene terephthalamide) fibers and these variations often poly(phenylene isophthalamide) systems. Further information regarding the method of manufacture and types of aromatic polyamide systems are shown in U.S. Pat. Nos. 3,869,429; 3,869,430 and U.S. Pat. No. 4,278,779, all of which are incorporated by reference.

Some of the significant advantages achieved by the particular combination of the particular urethane compositions described herein and the aromatic polyamides referred to for pneumatic polyurethane tires is that the urethane composition has outstanding adhesion to the cord. Second the aromatic polyamides have excellent strength characteristics and experience practically no elongation under the tension and compression environments experienced by the tire. Third, the aromatic polyamides are sufficiently stable at urethane molding temperatures such that they do not deform during the molding operation. This has been one of the biggest problems associated with the utilization of nylon fibers in urethane tires since they have a tendency to elongate during the molding operation.

The urethane compositions used in forming the reinforced, pneumatic tires comprise, a prepolymer formed by reacting an aromatic isocyanate of the formula:

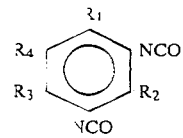

where $R_1$, $R_2$, $R_3$ and $R_4$ are hydrogen, alkyl having 1-4 carbon atoms, nitrile, halogen, $CO_2R_5$, $CONR_6R_7$ where $R_5$ is an alkyl group of 1-6 carbon atoms, and $R_6$ and $R_7$ are hydrogen or an alkyl of 1-6 carbon atoms with a long-chain polyol and then reacting the prepolymer with a chain extender mix.

The isocyanate as shown can be substituted with a variety of groups without substantially interfering with the hysteresis properties of the polymer. In some cases where a plurality of large alkyl groups is present on the molecule there may be some steric hindrance as compared to a short chain, mono alkyl substituted molecule such as toluene diisocyanate. Specific isocyanates suited for practicing the invention include toluene diisocyanate, phenylene diisocyanate, xylylene diisocyanate, diethyl toluene diisocyanate, and chlorotoluene diisocyanate. Isomer mixtures of these isocyanates can also be used.

The polyol used in forming the prepolymer is either a polyalkylene ether, polylactone or polyester polyol particularly those conventionally used in the production of elastomeric polyurethanes. These polyol systems include organic compounds which contain at least two hydroxyl groups and have a molecular weight from about 500 to 5000 and preferably a molecular weight from about 1,000 to about 3,000. Polyester polyols which are linear or slightly branched can be used and are obtained by the reaction of carboxylic acids and mono or polyhydric alcohols which include amino alcohols and diamino alcohols. Examples of polycarboxylic acids used for preparing polyester polyols include oxalic acid, malonic acid, succinic acid, glutaric acid, suberic acid, azelic acid, maleic acid, fumaric acid and the like as well as hydroxy carboxylic acids. Polyols used in the preparation of the polyester polyols include ethylene glycol, propylene glycols, butane diols, pentane diols, hexane diols and heptane diols.

Another class of polyols suited for preparing the polyisocyanate prepolymers include polyether polyols and are derived by condensing an alkylene oxide with an initiator. Initiators generally are difunctional compounds and include water, or glycols such as ethylene glycol, propylene glycol, hexane diol, ethanolamine, propanolamine and the like. Preferred polyols are the polyether polyols such as poly(tetramethyleneglycol) and polycaprolactone.

The isocyanate and polyol can be reacted together, in conventional manner, to form a prepolymer. The proportion of each reactant is controlled so that there is a free isocyanate content of about 2-12% by weight. When less than 2% isocyanate is present in the polymer, it is difficult to incorporate the amine chain extender into the polymer with the desired uniformity necessary to achieve desired rigidity. When more than 12% free isocyanate is present, the prepolymer may be too reactive with the chain extender mix to achieve proper molding. And, if a less reactive amine chain extender is employed, the molding operation may be excessive in terms of time. Normally, for desirable molding operations, the free isocyanate content is from 5–10% by weight.

The chain extender mix used for the polyurethane molding composition consists of (1) an aromatic diamine of the formula:

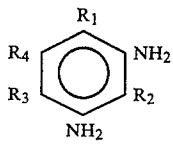

where $R_1 R_2 R_3 R_4$ represents H, alkyl from $C_{1-4}$ atom, CN, halogen, $CO_2R_5$, $CONR_6R_7$ where $R_5$ represents alkyl of 1–6 carbon atoms and $R_6 R_7$ represents alkyl of 1–6 carbon atoms and H, and mixtures thereof and (2) a polyol of about 500–5000 molecular weight of which at least 90% of the polyol is difunctional. The polyalkylene ether polylactone or polyester diol suitably is the same as that used in manufacturing the prepolymer, but can be any of the polyalkylene ether or polyester diols commonly used. It is incorporated into the chain extender mix in a proportion to provide 0.5–5 equivalent amine per equivalent polyol. Optionally, small amounts of short chain ($C_{2-14}$) diol or triol chain extender can be included in the chain extender mix such as, for example, up to 10% of the hydroxy functionality. Ethylene glycol, butane diols, glycerol or higher polyols, e.g. penterythritol, can be used. However, no significant advantages are achieved by incorporating a triol or higher polyol, and in some cases, the incorporation causes premature gelation or inhibits the ability of the product to withstand flexing.

The aromatic amines should be similar in structure and in substituent groups to the isocyanate. Also, isomer mixtures can be used. For preferred results, the aromatic diamine is toluene diamine, diethyl toluene diamine or chloro toluene diamine.

Trifunctional polyols or trifunctional amines when used in formulating the polyurethane molding composition provide too much rigidity through a three dimensional network and do not permit sustained flexing. Accordingly, a difunctional polyol or a difunctional amine is required as a major portion of the polyol in the prepolymer and chain extenders, e.g. 90% or greater equivalent functionality to establish a two-dimensional polymer network.

It is understood that conventional plasticizers, fillers, pigments, and other additives commonly used in molding applications can be used here. As is customary with the use of additives their effect/performance characteristics need to be evaluated as they sometimes may reduce performance.

The following examples are provided to illustrate embodiments of the invention and are not intended to restrict the scope thereof.

EXAMPLE 1

A polyalkylene ether isocyanate prepolymer comprising about 5.17 weight %-free NCO groups was prepared in conventional manner from about 1000 weight parts of a linear alkylene polyol i.e. poly(tetramethylene glycol) having a molecular weight of about 2000 and a hydroxyl number of 56, and about 217.7 weight parts of toluene-2,4-diisocyanate and toluene-2,6-diisocyanate in an isomer ratio of about 80:20 by first mixing the components and then heating for about 1 hour at a temperature of 80° C. (Any ratio of 2–4 to 2–6 isomer can be used.)

A chain extender mix was prepared by mixing 1,000 weight parts of poly(tetramethylene glycol) having a molecular weight of 2,000 and a hydroxyl number of 56 with 122 weight parts of toluene diamine, the toluene diamine being the 2:4 and 2:6 isomer and present in a ratio of 80:20. In addition to the polyol and amine, there was included 350 weight parts dioctyl phthalate and 10 weight parts of Metasol catalyst.

Reinforced 165 mm×13 inch pneumatic passenger car tires then were manufactured according to the procedure described in U.S. Pat. No. 4,259,129 and this procedure is incorporated by reference. Briefly, this process involves molding a tire body about a core winding reinforcing cord about the circumference of the tire body and then molding the tread section over the reinforcing cord and attaching to the tire body. The reinforcing cord used in the manufacturing of the pneumatic tires were poly(p-phenylene terephthalamide) which is sold under the trademark Kevlar by the DuPont Company.

The polyurethane elastomer utilized consists of 60 parts by weight of the chain extender mix and 100 parts by weight of the polyalkylene ether isocyanate prepolymer. After inspection, the composition was cured at a temperature of 100° C.

After manufacture, the tires were inflated to the same pressure, e.g. 30 psig for testing. Some of the reinforced tires produced were loaded at 150% or 615 Kp and initially rotated at a rate to provide a circumferential speed of 75 km/hr. In another test some tires were loaded to 410 Kp and rotated for 1 hour at a speed of 180 km/hr., followed by rotation at 190 km/hr. for 10 minutes, and then at 200 km/hr. until failure.

All of the polyurethane tires passed the test through 190 km/hr and lasted for some time at 200 km/hr. No commercially available rubber radial tire passed the test or lasted as long as the polyurethane tires described here. In addition, at the conclusion of the test and tread temperature of the tires was measured and temperatures of 55°–60° C. were typical in the polyurethane tire. Rubber tires had a much higher tread temperature at failure e.g., 120°–140° C. These lower temperatures are evidence of the ability of the urethane polymer to dissipate heat during flexing and evidence of low hysteresis.

EXAMPLE 2

A series of urethane compositions were evaluated to determine their resistance to heat build up during flex conditions. If these compositions could not pass the initial test, they would inherently be unsatisfactory because of their poor hysteresis. However, if such composition passed the test, then these compositions would be suitable for the preparation of a reinforced tire with superior results being observed when the cord was an aromatic polyamide.

The polyurethane molding formulations set forth in Table I were evaluated with respect to hysteresis by the use of modified Goodrich flexometer operated at 25°–30° C. This flexometer is designed to simulate the load experienced by a tire, i.e., the flexing caused by compression and relaxation of the load. In this test a 5–10 gram sample having a cylindrical shape is placed under a fixed load between a plate and plunger. The plunger is moved inwardly and then outwardly to the original loading position at a rate simulating the speed encountered by a tire until the sample fails. At the time of failure, as indicated by a softening of the urethane molding formulation, the temperature at the center of molded products exposed to high shock and vibration environments.

TABLE I

| | PREPOLYMER A | | | CHAIN EXTENDER MIX B | | Parts Amine Parts | Part A |
|---|---|---|---|---|---|---|---|
| Run | Isocyanate/Parts | Polyol/Parts | % NCO Prepolymer | Aromatic Amine | Polyol | Parts Polyol | Part B |
| 2 | Toluene Diisocyanate (TDI) 2.5 | Polytetramethylene glycol/1 | 5.17 | Toluene Diamine (TDA) | No Polyol | — | 00:8 |
| *3 | Toluene Diisocyanate (TDI) 2.5 | No Polyol | — | Toluene Diamine (TDA) | Polytetramethylene glycol | 1:1 | — |
| *4 | Toluene Diisocyanate (TDI) 5 | Trimethylolpropane/5 | 29.3 | Toluene Diamine (TDA) | Polytetramethylene glycol | 1:1 | — |
| 5 | Toluene Diisocyanate (TDI) 2.5 | Polytetramethylene glycol/1 | 5.17 | Methylene bis-chloro aniline (MOCA) | Polytetramethylene glycol | 1:1 | 00:52 |
| 6 | Toluene Diisocyanate (TDI) 2.5 | Polycaprolactone/1 | 5.17 | Diethyl Toluene Diamine (DETDA) | Polycaprolactone | 1:1 | 00:50 |
| 7 | Toluene Diisocyanate (TDI) 2.5 | Polytetramethylene glycol/1 | 5.17 | TDA | Polytetramethylene glycol | 1:1 | 00:76 |
| 8 | Toluene Diisocyanate (TDI) 2.5 | Polycaprolactone/1 | 5.17 | TDA | Polytetramethylene glycol | 1:1 | 00:78 |
| 9 | Methylene diphenyl diisocyanate/2.5 | Polycaprolactone/1 | 4.85 | TDA | Polycaprolactone | 1:1 | 00:58 |
| 10 | TDI/5 | Polytetramethylene glycol/1 | 11.7 | 4-chlor-m-phenylene diamine | Polytetramethylene glycol | 4:1 | 00:73 |
| 11 | TDI/2 | Polycaprolactone/1 | 3.55 | m-phenylenediamine | Polycaprolactone | 1:1 | 00:39 |
| 12 | TDI/2 | " | 3.55 | 3,5-diamino-4-chloro-isobutyl benzoate | " | 1:1 | 00:43 |
| 13 | TDI/2 | " | 3.55 | methylene dianiline (MDA) | " | 1:1 | 00:34 |
| 14 | TDI/2.5 | " | 5.17 | tetra isopropyl MDA | " | 1:1 | 00:72 |
| 15 | TDI/2.9 | " | 6.37 | 5-chloro-TDA | " | 1:1 | 00:74 |

*Run 3 — The TDA and chain extender mix reacted too fast to mold.
*Run 4 — The viscosity of the prepolymer was too high so it was not possible to mix with the chain extender mix.

TABLE II

| | Flex Test | | Shore Hardness | Tensile | Tear Propagation |
|---|---|---|---|---|---|
| Run No. | End Temp. °C. | Failure Time | Elongation % at Break | Kp/cm | Resistance |
| 1 | 200 | 12 min. | 69/700 | 50 | 5 |
| 2 | impossible to test | | 36/400 | 30 | 3 |
| 3 | " | — | — | — | — |
| 4 | " | — | — | — | — |
| 5 | 170 | 1.5 min. | 30/860 | 10 | 3 |
| 6 | 180 | 5 min. | 67/620 | 50 | 7 |
| 7 | 200 | 14 min. | 76/680 | 10 | 4 |
| 8 | 200 | 10 min. | 77/580 | 110 | 3 |
| 9 | 180 | 2 min. | 53/690 | 75 | 9 |
| 10 | impossible to test | — | — | — | — |
| 11 | 180 | 5 min. | 67/700 | 150 | 5 |
| 12 | 190 | 5 min. | 72/840 | 150 | 4 |
| 13 | 180 | 1.5 min. | 71/740 | 65 | 5 |
| 14 | 170 | 1.5 min. | 74/650 | 10 | 5 |
| 15 | 190 | 6 min. | 60/740 | 50 | 4 | the polymer cylinder is measured and the failure time recorded. Table II provides the end temperature and failure time as well as other various physical properties of the urethane molding formulations of Runs 2 through 15. From these runs, only these polyurethane compositions having the symmetry as described previously gave sufficiently good times to failure. Accordingly, these compositions would make acceptable tires. But, of course, those formulations which gave the best times as in Example 1, would be expected to produce tires having the best resistance to failure at high speed. Those with lower times, e.g., the run 12 and 15 formulations would give much poorer results.

STATEMENT OF INDUSTRIAL APPLICATION

The polyurethane compositions of this invention, by virtue of their low hysteresis, have application in the manufacture of tires suited for high speed and for molded products exposed to high shock and vibration environments.

We claim:
1. In a reinforced urethane tire formed by injecting a polyurea/polyurethane forming composition comprising a prepolymer having an excess of isocyanate groups and an aromatic diamine chain extender, into a tire mold, encapsulating a reinforcing cord in said tire and then curing said composition, the improvement for producing polyurea/polyurethane composition having low hysteresis which comprises reacting:
(a) a prepolymer formed by the reaction of (1) an aromatic polyisocyanate represented by the formula:

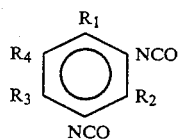

where $R_1$ $R_2$ $R_3$ $R_4$ represents H, alkyl from 1–4 carbon atoms, CN, halogen, $CO_2R_5$, $CONR_6R_7$ where $R_5$ represents alkyl of 1–6 carbon atoms and $R_6 R_7$ represents alkyl of 1–6 carbon atoms and H, and mixtures thereof and (2) a polyol of about 500–5000 molecular weight of which at least 90% of the polyol is difunctional in a quantity sufficient to provide from about 2 to 12 weight % isocyanate groups in said prepolymer; with (b) a chain extender mix comprising (1) an aromatic diamine represented by the formula:

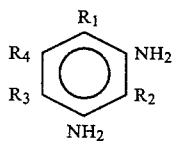

where $R_1$ $R_2$ $R_3$ $R_4$ represents H, alkyl from 1–4 carbon atoms, CN, halogen, $CO_2R_5$, $CONR_6R_7$ where $R_5$ represents alkyl of 1–6 carbon atoms and $R_6R_7$ represents alkyl of 1–6 carbon atoms and H, and mixtures thereof and (2) a polyol having a molecular weight of from 500–5,000 of which at least 90% of polyol is difunctional, said diamine being present in said chain extender mix to provide a proportion of from 0.5–5 equivalents amine per equivalent polyol.

2. The reinforced tire of claim 1 wherein said isocyanate in said prepolymer is toluene diisocyanate, and alkyl of halo-substituted derivative of toluene diisocyanate or m-phenylene diisocyanate.

3. The reinforced tire of claim 2 wherein at least 90% of the amine equivalent in the chain extender mix is toluene diamine, an alkyl or halo-substituted derivative of toluene diamine; or m-phenylene diamine.

4. The reinforced tire of claim 3 wherein said polyol in said prepolymer mix is a polyether, polyester, or polylactone polyol and has a molecular weight from 1000–3000.

5. The reinforced tire of claim 4 wherein said polyol in said chain extender mix is a polyether, or polyester polyol.

6. The reinforced tire of claim 4 wherein said polyol is polytetramethylene glycol is polycaprolactone diol.

7. The reinforced tire of claim 5 wherein said aromatic diamine is toluene diamine.

8. The reinforced tire of claim 5 wherein said aromatic diamine is diethyltoluene diamine.

9. The reinforced tire of claim 5 wherein said aromatic diamine is chlorotoluene diamine.

10. The reinforced tire of claim 5 wherein said aromatic diamine is m-phenylene diamine.

11. The reinforced tire of claim 5 wherein said aromatic diamine is

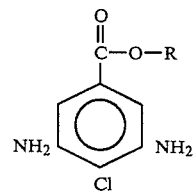

where R is an alkyl group from 1–6 carbon atoms.

12. The reinforced tire of claim 3 wherein said isocyanate in said prepolymer is derived from m-phenylene diisocyanate and said diamine is m-phenylene diamine.

13. The reinforced tire of claim 3 wherein said isocyanate in said prepolymer is toluene diisocyanate and said diamine is toluene diamine.

14. The reinforced tire of claim 7 wherein said polyol used in the prepolymer and chain extender is the same.

15. The reinforced tire of claim 7 where the isocyanate content in the prepolymer is from 5 to 10 weight % and the proportion of aromatic amine in said chain extender mix provides from 1–3 equivalents amine per equivalent polyol.

16. The reinforced tire of claim 9 wherein said reinforcing cord is an aromatic polyamide.

* * * * *